US012085445B2

(12) United States Patent
Yoon et al.

(10) Patent No.: US 12,085,445 B2
(45) Date of Patent: Sep. 10, 2024

(54) ABSOLUTE LINEAR-IN-K SPECTROMETER

(71) Applicant: University of Rochester, Rochester, NY (US)

(72) Inventors: Changsik Yoon, Rochester, NY (US); Jannick P. Rolland-Thompson, Seneca Falls, NY (US); Aaron Bauer, Penfield, NY (US)

(73) Assignee: University of Rochester, Rochester, NY (US)

( * ) Notice: Subject to any disclaimer, the term of this patent is extended or adjusted under 35 U.S.C. 154(b) by 367 days.

(21) Appl. No.: 17/603,487

(22) PCT Filed: Apr. 3, 2020

(86) PCT No.: PCT/US2020/026657
§ 371 (c)(1),
(2) Date: Oct. 13, 2021

(87) PCT Pub. No.: WO2020/214438
PCT Pub. Date: Oct. 22, 2020

(65) Prior Publication Data
US 2022/0221339 A1    Jul. 14, 2022

Related U.S. Application Data

(60) Provisional application No. 62/834,568, filed on Apr. 16, 2019.

(51) Int. Cl.
*G01J 3/18*     (2006.01)
*G01B 9/02091*  (2022.01)
(Continued)

(52) U.S. Cl.
CPC ............ *G01J 3/18* (2013.01); *G01B 9/02091* (2013.01); *G01J 3/0208* (2013.01); *G01J 2003/1208* (2013.01)

(58) Field of Classification Search
CPC .... G01J 3/18; G01J 3/0208; G01J 2003/1208; G01B 9/02091
See application file for complete search history.

(56) References Cited

U.S. PATENT DOCUMENTS

2012/0242988 A1*  9/2012  Saxer ................... G01J 3/14
                                                356/326
2016/0232258 A1*  8/2016  Yang .................. G02B 27/0012

OTHER PUBLICATIONS

Zhilin Hu and Andrew M. Rollins, "Fourier domain optical coherence tomography with a linear-in-wavenumber spectrometer," Opt. Lett. 32, 3525-3527 (2007) (Year: 2007).*
(Continued)

*Primary Examiner* — Uzma Alam
*Assistant Examiner* — Jonathon Cook
(74) *Attorney, Agent, or Firm* — Andrew J. Anderson, Esq.; Harter Secrest & Emery LLP

(57) ABSTRACT

A detector system for Fourier spectroscopy such as a spectral domain optical coherence tomography instrument includes a diffractive optic for diffracting the interfering light into angularly dispersed wavenumbers, a prism for reduces a nonlinear angular dispersion among the wavenumbers, and a focusing optic for converting the angularly dispersed wavenumbers from the prism into spatially distributed wavenumbers along a detector having an array of pixels. A field lens between the focusing optic and the detector has a freeform surface for more evenly distributing the wavenumbers along the array of pixels.

15 Claims, 8 Drawing Sheets

(51) Int. Cl.
    *G01J 3/02*        (2006.01)
    *G01J 3/12*        (2006.01)

(56) References Cited

OTHER PUBLICATIONS

Gelikonov, V.M., Gelikonov, G.V. & Shilyagin, P.A. Linear-wavenumber spectrometer for high-speed spectral-domain optical coherence tomography. Opt. Spectrosc. 106, 459-465 (2009). https://doi.org/10.1134/S0030400X09030242 (Year: 2009).*

Sang-Won Lee, Heesung Kang, Joo Hyun Park, Tae Geol Lee, Eun Seong Lee, and Jae Yong Lee, "Ultrahigh-Resolution Spectral Domain Optical Coherence Tomography Based on a Linear-Wavenumber Spectrometer," J. Opt. Soc. Korea 19, 55-62 (2015) (Year: 2015).*

Wu et al., Optimization of linear-wavenumber spectrometer for high-resolution spectral domain optical coherence tomography, Optics Communications, vol. 405, 2017, pp. 171-176, ISSN 0030-4018, https://doi.org/10.1016/j.optcom.2017.08.016 (Year: 2017).*

Lan, G., Li, G. Design of a k-space spectrometer for ultra-broad waveband spectral domain optical coherence tomography. Sci Rep 7, 42353 (2017). https://doi.org/10.1038/srep42353 (Year: 2017).*

\* cited by examiner

ABSOLUTE LINEAR-IN-K SPECTROMETER

TECHNICAL FIELD

The invention relates to spectrometers, including spectrometers used in spectral domain optical coherence tomography (SD-OCT), and to the linearization of wavenumbers distributed along spectrometer detector arrays.

BACKGROUND

Conventional benchmark spectrometers typically exhibit an intrinsic nonlinearity in wavenumber (k) spacing along an array of detector pixels. This nonlinearity can generally be attributed to the nonlinear angular dispersion of wavenumbers by the optics, e.g., diffraction gratings or prisms, that are used to disperse the wavenumbers.

For spectrometers used in spectral domain optical coherence tomography (SD-OCT), where modulation frequencies of interference-based intensity variations detected along the detector array are interpreted as measurements of distance, the nonlinearity in wavenumber spacing in benchmark spectrometers complicates the transformation of the detected intensity variations into the proper frequency domain. For example, the nonlinearity in wavenumber dispersion along the detector array generally requires post processing of the detected intensity patterns in the form of linear interpolations prior to performing a fast Fourier transform (FFT) to determine the modulation frequency. Such post processing can be computationally expensive, slowing the determination of the modulation frequency by six-fold and thereby hindering the collection of measurement data in real time. Interpolations and other forms of estimations for fitting the collected intensity data into a form compatible with the desired transformation into the frequency domain can also add noise or other forms of uncertainty to the resulting measurements. The approximative interpolations tend to result in small interpolation errors as well as a loss of interference contrast whose effects become more pronounced as modulation frequencies increase. The higher modulation frequencies tend to be subject to both a reduction in the signal to noise ratio (SNR) and an increase in the axial measurement resolution (i.e., the axial point spread function full width half maximum (FWHM) of the Fourier peak) as the maximum range of measurement distance (i.e. imaging depth) associated with the wavenumber spacing between pixels is approached.

A significant reduction in the nonlinear distribution of wavenumbers along a detector array has been achieved by pairing a diffraction grating together with a custom prism for performing the angular dispersion. We refer to spectrometers reaching the level of nonlinearity achievable with solely a paired grating and prism as quasi linear-in-k spectrometers. In quasi linear-in-k spectrometers, optimizations of the grating and prism pairing have allowed for direct transformation of the intensity patterns along the director array into the frequency domain while achieving a signal-to-noise ratio (SNR) gain over benchmark spectrometers requiring interpolation of intensity data. However, some residual nonlinearity in wavenumber spacing along the detector array remains, which can result in degraded (i.e., increased) axial resolution with measurement distance. For example, as a result of the residual nonlinearity, Fourier peaks by which the modulation frequency is identified tend to reduce in amplitude with increases in the modulation frequency, which is associated with increases in measurement distance.

SUMMARY

Various embodiments contemplate improvements over both benchmark spectrometers requiring interpolation of intensity data and quasi linear-in-k spectrometers optimizing wavenumber spacing using paired grating and prism combinations. In a version combining the focusing optics of a benchmark spectrometer with a paired grating and prism combination simulating a quasi linear-in-k spectrometer, residual nonlinearity of the spatial distribution of wavenumbers along the detector array can be reduced, thereby reducing the drop off in the signal-to-noise ratio (SNR) but resulting in the degradation of axial resolution with measurement distance, depending on the residual nonlinearity. In fact, such residual nonlinearity can be further reduced to the point where any further reduction in nonlinearity has no significant effect further reducing both the drop off in the signal-to-noise ratio (SNR) and axial resolution with measurement distance. We refer to spectrometers reaching this level of nonlinearity as absolute linear-in-k spectrometers.

As a comparative measure of residual nonlinearity in wavenumber spacing across the detector array as a percent, a modeled benchmark spectrometer has a residual nonlinearity of 2.47 percent and a modeled quasi linear-in-k spectrometer has a residual nonlinearity of 0.05 percent. Two modeled embodiments of an absolute linear-in-k spectrometer exhibit respective residual nonlinearities of $2.79 \times 10^{-5}$ percent (0.0000279 percent) and $3.36 \times 10^{-9}$ percent (0.00000000336 percent). Both absolute linear-in-k spectrometers perform equivalently over linear scales in which the performances of benchmark and quasi linear-in-k spectrometers are also represented. The high linearity in wavenumber spacing obviates any need for interpolating intensity data of the detector array while relatively increasing the signal-to-noise ratio (SNR) and relatively decreasing the axial resolution approaching the maximum measurement distance. Thus, good accuracy can be maintained throughout the measurement range.

One embodiment as an absolute linear-in-k spectrometer includes a diffractive optic for diffracting collimated light from an entrance aperture into angularly dispersed wavenumbers, a prism for reducing a nonlinear angular dispersion among the wavenumbers, and a focusing optic for converting the angularly dispersed wavenumbers from the prism into spatially distributed wavenumbers along a detector. A field lens between the focusing optic and the detector has a freeform surface with a surface geometry that reduces field dependent aberrations introduced by the prism and more linearly distributes the wavenumbers along the detector.

The surface geometry of the freeform surface can be arranged to reduce residual linearity of the wavenumbers distributed along the detector to less than $10^{-4}$ percent and dependent upon accuracy requirements or other considerations by even lesser amounts such between $10^{-5}$ percent to $10^{-9}$ percent. The residual nonlinearity RN as a percent can be determined in accordance with the following expression:

$$RN[\%] = \frac{\sqrt{\left(\int_{k_{min}}^{k_{max}} [f(k) - g(k)]^2 dk\right) / (k_{max} - k_{min})}}{f(k_{max}) - f(k_{min})} \times 100$$

where $k_{max}$ and $k_{min}$ are respective maximum and minimum wavenumbers distributed along the detector, f(k) is a function of calibration relating wavenumbers to pixels of the detector, and g(k) is the linear (first-order) approximation of f(k) with the least root mean square (RMS) error.

The freeform surface can have a sag z defined in accordance with the following expression:

$$z = \frac{cr^2}{1 + \sqrt{1 - (1+k_c)c^2 r^2}} + \sum_j C_j Z_j(\rho, \varphi),$$

where r is a radial coordinate of the surface, c is a curvature of a base sphere, $k_c$ is a conic constant, $\rho$ and $\varphi$ are normalized radial and azimuthal components in an aperture, and $C_j$ is a weight factor of a $j^{th}$ Zernike term, $Z_j$. The weight factor $C_j$ is can be determined in a way that chief rays of evenly spaced wavenumbers are distributed along the detector in a form that is maximized toward an even spacing of the chief rays along the detector. The expression can include 16 Zernike terms Zj, although more Zernike terms can be used where needed or for other purposes. The number of Zernike terms used for defining the freeform surface can also depend upon both the pixel pitch and the spectral dispersion of the spectrometer.

The prism can be arranged as a Brewster-angled prism (BAP) that is oriented and spaced between the diffractive optic and the focusing optic for reducing the nonlinear angular dispersion among the wavenumbers. The field lens has front surface facing the focusing optic and a rear surface facing the detector, and the freeform surface can be formed in either the rear or front surfaces of the field lens. The focusing optic can comprise a plurality of lenses each exhibiting rotational symmetry about a common optical axis.

Another embodiment as a detector system for a spectral domain optical coherence tomography instrument includes a diffractive optic for receiving light comprising a range of wavenumbers subject to interference phase variations as a function of optical path length differences between a test object and a reference and for diffracting the interfering light into angularly dispersed wavenumbers. A prism reduces a nonlinear angular dispersion among the wavenumbers. A focusing optic converts the angularly dispersed wavenumbers from the prism into spatially distributed wavenumbers along a detector having an array of pixels. A field lens between the focusing optic and the detector has a freeform surface for more evenly distributing the wavenumbers along the array of pixels. A processor receives intensity data from the respective pixels and transforms rates of variation in the intensity data into relative optical path length difference measurements between the test object and the reference over a range of measurement related to a wavenumber spacing between the pixels. The freeform surface has a surface geometry that reduces nonlinearity of the wavenumbers along the array of pixels such that measurement resolution over the range of measurement varies by less than 5 percent.

The surface geometry of the freeform surface can reduce nonlinearity of the wavenumbers along the array of pixels such that any further reduction in the nonlinearity alone does not further change the measurement resolution over the range of measurement. The surface geometry of the freeform surface can reduce residual nonlinearity of the wavenumbers along the array of pixels to achieve the targets for an absolute linear-in-k spectrometer as described in the preceding embodiment. A sag of the freeform surface for achieving these targets can be defined by a plurality of polynomial terms as also described in the preceding embodiment.

The processor can transform the rates of variation in the intensity data into the relative optical path length difference measurements without requiring linear interpolations among the wavenumbers collected by the respective pixels. The surface geometry of the freeform surface can also provide for reducing field dependent aberrations introduced by the prism for focusing the spatially distributed wavenumbers along the array of pixels with more consistent spot sizes.

One method of making an absolute linear-in-k spectrometer includes arranging a diffractive optic for receiving collimated light from an entrance aperture and for diffracting the light into angularly dispersed wavenumbers and arranging a focusing optic for focusing the angularly dispersed wavenumbers through a field lens into spatially distributed positions along a detector. A Brewster-angled prism is interposed between the diffractive optic and the focusing optic. The diffractive optic and the prism are angularly oriented and the prism is spaced with respect to both the diffractive optic and the focusing optic for reducing a nonlinear distributions of the wavenumbers along the detector. The field lens is provided with a freeform surface having a surface geometry for reducing field dependent aberrations introduced by the Brewster-angled prism and for more evenly distributing the wavenumbers along the detector.

The focusing optic can be arranged as a plurality of lenses each exhibiting rotational symmetry about a common optical axis. The diffractive optic and the plurality of lenses can be designed according to a prescription for use in benchmark spectrometer, wherein residual nonlinearity of the wavenumbers along the detector is greater than one percent. The Brewster-angled prism can be oriented and spaced between the diffractive optic and the focusing optic for reducing the residual nonlinearity of the wavenumbers along the detector to less than one percent but greater than $10^{-2}$ percent. The surface geometry of the freeform surface can reduce the residual nonlinearity of the wavenumbers along the detector to less than $10^{-4}$ percent and dependent upon accuracy requirements or other considerations by even lesser amounts such as between $10^{-5}$ percent and $10^{-9}$ percent. A sag of the freeform surface for achieving these targets can be defined by a plurality of polynomial terms in which coefficients of the polynomial terms are constrained so that chief rays of evenly spaced wavenumbers are distributed along the detector in a form that is maximized toward an even spacing of the chief rays along the detector.

BRIEF DESCRIPTION OF THE DRAWING FIGURES

DETAILED DESCRIPTION

Figure 1A:
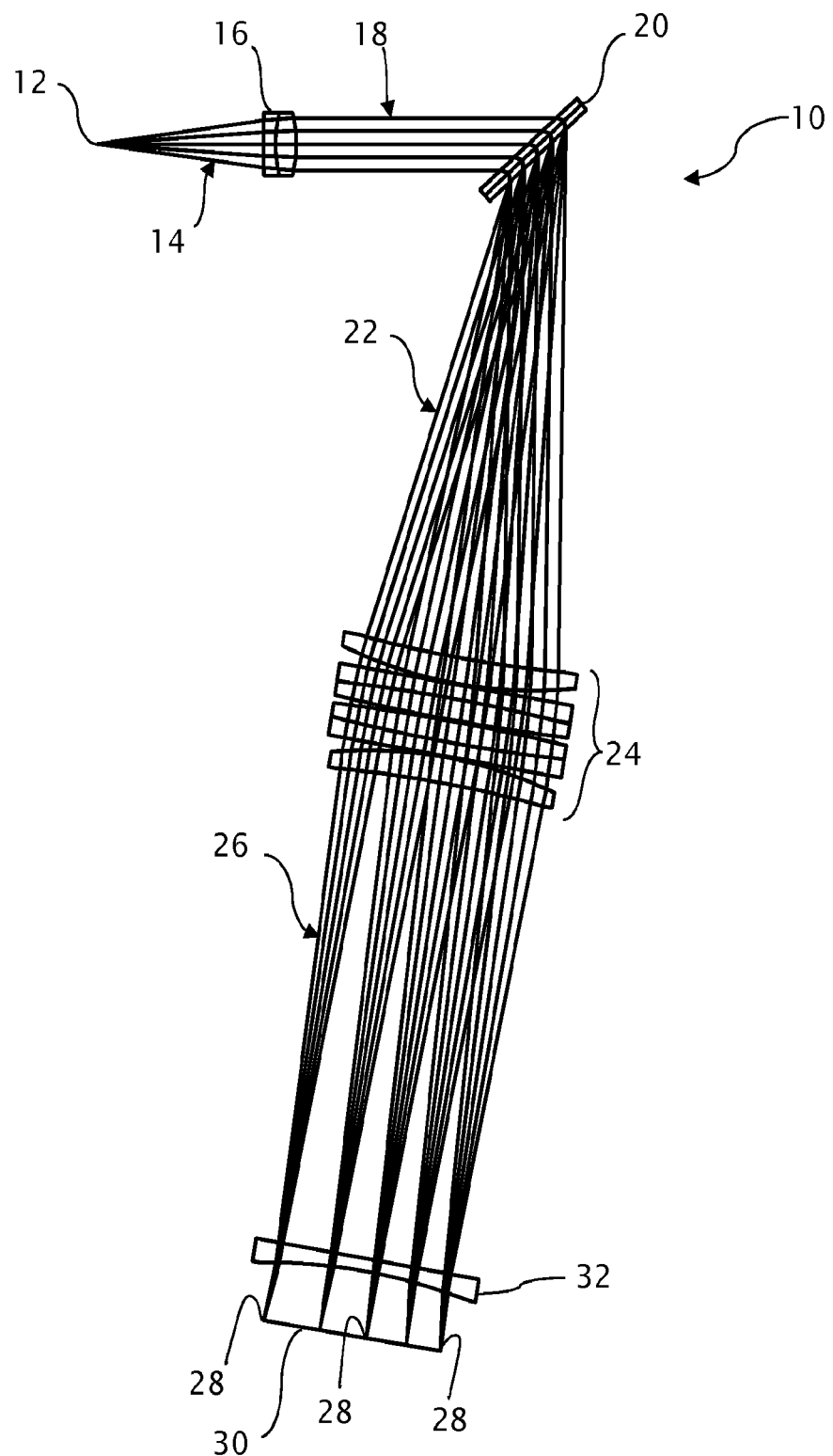
FIG. 1A is an optical diagram of a benchmark spectrometer showing pathways by which different wavenumbers are focused along a detector.

FIG. 1A depicts an example of a benchmark spectrometer 10 operating in the near infrared (NIR) region (e.g., 790-900 nm) with a spectral resolution ranging from 0.035-0.052 nm. The spectrometer 10 is of a type used in detector system for a spectral domain optical coherence tomography (SD-OCT) instrument.

An entrance aperture 12, such as the output end of a single-mode fiber (not shown), emits a diverging light beam 14 comprising a range of wavelengths corresponding to the operating range of the spectrometer 10. As a part of a spectral domain optical coherence tomography (SD-OCT) instrument, the spectral output of the single mode fiber is generally referenced as a range of wavenumbers (the inverse of wavelength), which are subject to interference phase variations as a function of optical path length differences between a test object and a reference.

A collimating optic 16, shown as a lens doublet, converts the diverging beam 14 from the entrance aperture 12 into a collimated beam 18. A diffractive optic 20, such as a diffraction grating, diffracts the collimated beam 18 into a plurality of angularly dispersed beams 22 of different wavenumbers. The different wavenumber beams remain substantially collimated as a function of the size of the entrance aperture 12 but are relatively oriented through different angles as a function of their wavenumber. A focusing optic 24, shown as a plurality of radially symmetric lenses about a common optical axis, converts the angularly dispersed beams 22 of different wavenumbers into spatially distributed beams 26 of the different wavenumbers that are respectively focused to respective spots 28 along a detector 30, such as a charge coupled device (CCD) or a complementary metal oxide semiconductor (CMOS), having an array of pixels for recording the intensities of the focused wavenumbers. A field lens 32 located between the focusing optic 24 and the detector 30 provides a telecentric field effect in which the focus spots 28 are axially aligned with the detector 30 along one dimension of an image plane.

Figure 1B:
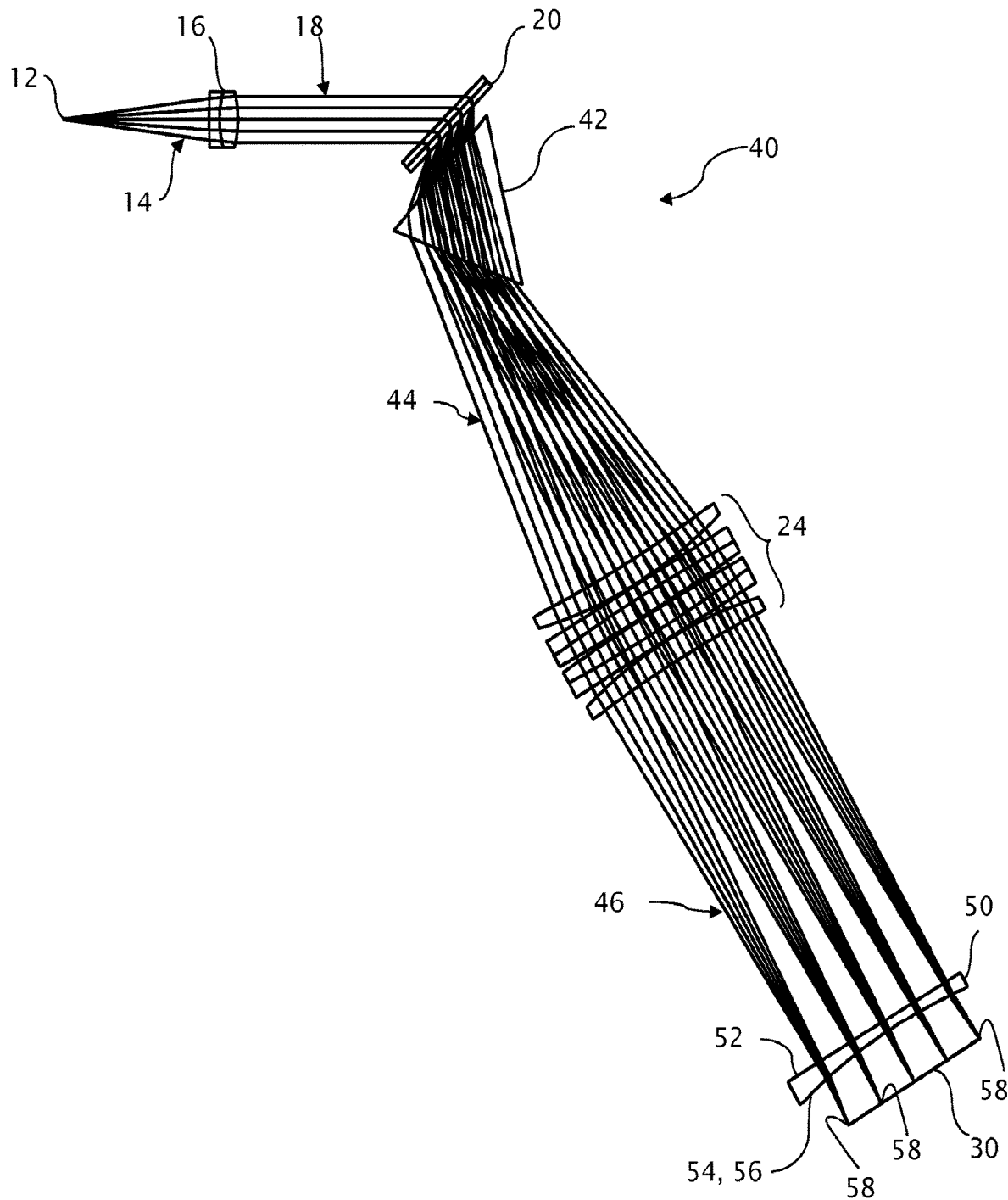
FIG. 1B is an optical diagram of an absolute linear-in-k spectrometer showing similar ray bundles that are more evenly distributed along the detector.

FIG. 1B depicts an example of an absolute linear-in-k spectrometer 40 as an adaptation of the benchmark spectrometer 10. The absolute linear-in-k spectrometer 40 shares a number of components in common with the benchmark spectrometer 10 and operates over the same spectral range. The shared components include the entrance aperture 12, the collimating optic 16, the diffractive optic 20, the focusing optic 24 and the detector 30.

In addition to these components, the absolute linear-in-k spectrometer 40 includes a prism 42, such as a $CaF_2$-Brewster angled prism (BAP), that is interposed between the diffractive optic 20 and the focusing optic 24. The rotational orientations of both the diffractive optic 20 and the prism 42 and the respective spacings of the prism 42 with both the diffractive optic 20 and the focusing optic 24 are optimized similar to a quasi linear-in-k spectrometer to reduce nonlinearity in the wavenumber distribution along the detector 30. That is, the diffractive optic 20 together with the prism 42 convert the collimated beam 18 into a plurality of more linearly angularly dispersed beams 44 of different wavenumbers such that the unchanged focusing optic 24 further converts the angularly dispersed beams 44 into more linearly spatially distributed beams 46 of the different wavenumbers. This approach, however, unlike the design of a conventional quasi linear-in-k spectrometer, allows the basic optics of the benchmark spectrometer 10 to be reused.

Also like the benchmark spectrometer 10, the absolute linear-in-k spectrometer 40 includes a field lens 50, but the field lens 50 is formed as a freeform optic. The field lens 50 has front surface 52 facing the focusing optic 24 and a rear surface 54 facing the detector 30. The front surface 52 can match the corresponding front surface of the field lens 32. However, unlike the field lens 32, the rear surface 54 of the field lens 50 is formed as a freeform surface 56, which is arranged to further reduce the residual nonlinearity in the distribution of wavenumbers along the display 30. The further reduction in the residual nonlinearity can be so radical that any further reduction in nonlinearity would have no significant effect further reducing both a drop off in the signal-to-noise ratio (SNR) and axial resolution with measurement distance.

The geometric form of the freeform surface 56 can be defined at all points of the freeform surface 56 as a sag z that is mathematically described using the Fringe Zernike polynomials as follows:

$$z = \frac{cr^2}{1 + \sqrt{1 - (1 + k_c)c^2 r^2}} + \sum_j C_j Z_j(\rho, \varphi), \quad (1)$$

where r is the radial coordinate of the freeform surface 56, c is the curvature of a base sphere, $k_c$ is the conic constant, $\rho$ and $\varphi$ are normalized radial and azimuthal components in the aperture, and $C_j$ is the weight factor of the $j^{th}$ Zernike term, $Z_j$. The weight factor $C_j$ in the equation serves as coefficients of the Zernike terms $Z_j$, and these coefficients are constrained according to an optimization routine such that that the chief rays of evenly spaced wavenumbers incident to the detector 30 are located at evenly spaced positions along the detector 30. The routine minimizes the lateral offset of the chief rays of the calibrated wavenumbers from pixel centers along the detector 30. The routine also assures that no additional piston or defocus is contributed by the freeform surface 56 to preserve the underlying function of the field lens 50 for axially aligning focus spots 58 with the detector 30 along the one dimension of an image plane in a preferably telecentric manner.

Two freeform surface geometries are investigated to explore a potential trade-off in the number of Zernike terms subject to optimized weighting, which relates to design complexity and optimization time. Design #1 is made with Zernike terms $Z_1$ to $Z_{16}$ while design #2 extends the Zernike terms from $Z_1$ to $Z_{37}$. Where possible, constraints can also be imposed on the overall design to minimize the maximum local slope of the freeform surface 50 to favor its manufacturability.

Figure 2A:
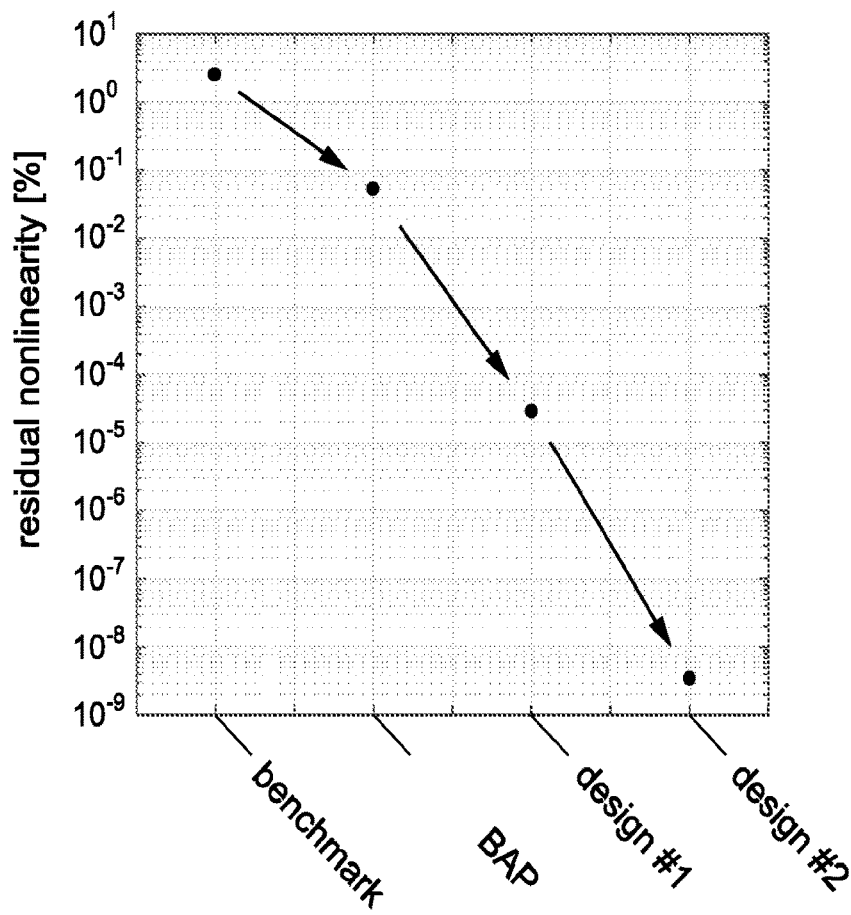
FIG. 2A is a graph comparing residual nonlinearities among four spectrometers on a logarithmic scale.

A residual nonlinearity in wavenumber distribution along the detector 30, denoted as RN, can be quantified using a unitless nonlinearity metric defined as follows:

$$RN[\%] = \frac{\sqrt{\left(\int_{k_{min}}^{k_{max}} [f(k) - g(k)]^2 dk\right) / (k_{max} - k_{min})}}{f(k_{max}) - f(k_{min})} \times 100 \qquad (2)$$

where $k_{max}$ and $k_{min}$ are the maximum and minimum wavenumbers respectively, $f(k)$ is the function of calibration to relate wavenumber to detector pixel, and $g(k)$ is the linear (first-order) approximation of $f(k)$ with the least root mean square (RMS) error. Under this metric, the residual nonlinearity RN of the benchmark spectrometer 10 is 2.47 percent, which drops to 0.05 percent after adding the Brewster-angled prism (BAP). However, by also using a freeform surface 56 as defined above, the residual nonlinearity RN is further decreased to $2.79 \times 10^{-5}$ percent for design #1 and to $3.36 \times 10^{-9}$ percent for design #2, as shown logarithmically in the graph of FIG. 2A.

Figure 2B:
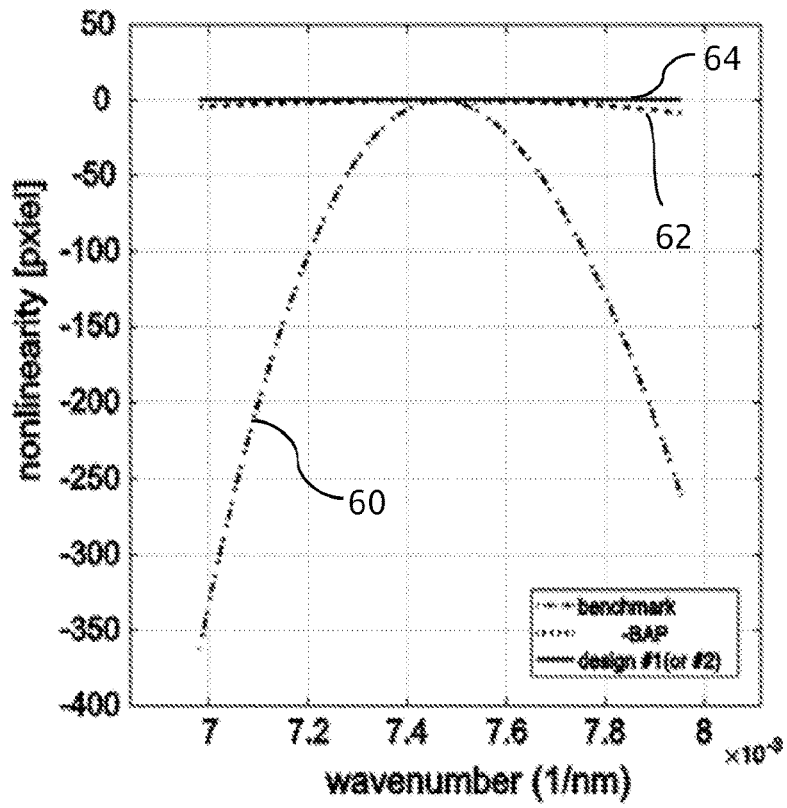
FIG. 2B is a graph of pixel nonlinearities of the four spectrometers over a range of wavenumbers.

On a linear scale, the graph of FIG. 2B shows the departure of individual pixels from linearity over the full range wavenumbers. The parabolic shaped line 60 shows the nonlinearity of the benchmark spectrometer 10 over the range of wavenumbers. The much less curved dashed line 62 shows the nonlinearity of the benchmark spectrometer as significantly corrected by the addition of the Brewster-angled prism (BAP) 42 and its associated adjustments. Finally, the straight line 64 represents the radical improvements in linearity associated with designs #1 and #2 of the absolute linear-in-k spectrometer 40 in which the improvements between the two designs appear indistinguishable at the given linear scale.

Spectral resolution, which determines the maximum range of measurement for a spectral domain optical coherence tomography (SD-OCT) instrument, can be defined as the spectral bandwidth that one pixel of the detector 30 subtends. For a detector having an array of 4096 pixels with a 10 μm pixel size, a 10-μm-width rectangular window can be convolved with the line spread functions (LSF) of evenly-spaced wavenumbers to estimate the effective spectrum collected by one pixel. The spatial FWHM of the convolved line spread function (LSF) can be converted to the spectral FWHM using the function of calibration, $f(k)$.

Figure 3:
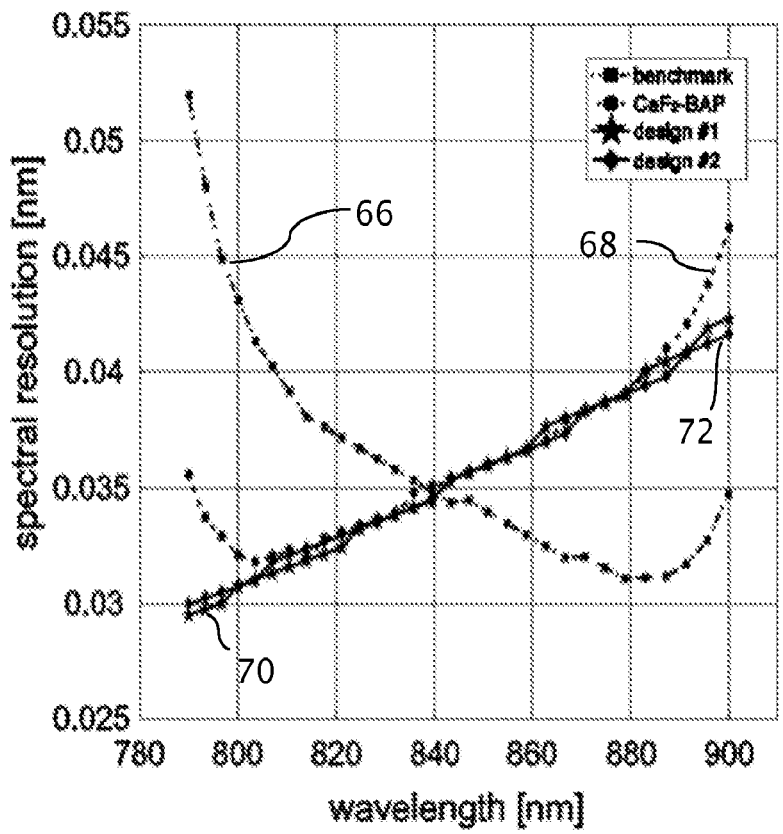
FIG. 3 is a graph of spectral resolution of the four spectrometers over a range of wavelengths.

Spectral resolution in nanometers is plotted in FIG. 3 for the four referenced spectrometers over the full range of wavelengths (790 nm to 900 nm). Line 66 plots the spectral resolution of the pixels of the benchmark spectrometer 10, which varies in a nonlinear manner over the range of wavelengths. Line 68 plots the spectral resolution of the pixels of the benchmark spectrometer modified by the addition of the Brewster-angled prism (BAP) 42, which remains linear through most of the plotted range except at the ends of the spectrum. Lines 70 and 72 plot the respective spectral resolutions of designs #1 and #2 of the absolute linear-in-k spectrometer 40 in which both lines 70 and 72 remain substantially linear throughout the full range of wavelengths.

For all four spectrometers represented in FIG. 3, an average spectral resolution of 30 evenly-spaced wavenumbers remains substantially the same (0.036 nm). Other than for the benchmark spectrometer 10, spectral resolution tends to increase as wavelength increases (or wavenumber decreases). This is a manifestation of the linearization in wavenumbers over the pixels because the spectral resolution can be influenced by the width of the point spread function PSF of the focal spots (e.g., 28 or 58 of FIGS. 1A and 1B), which is proportional to the wavelength.

Figure 4:
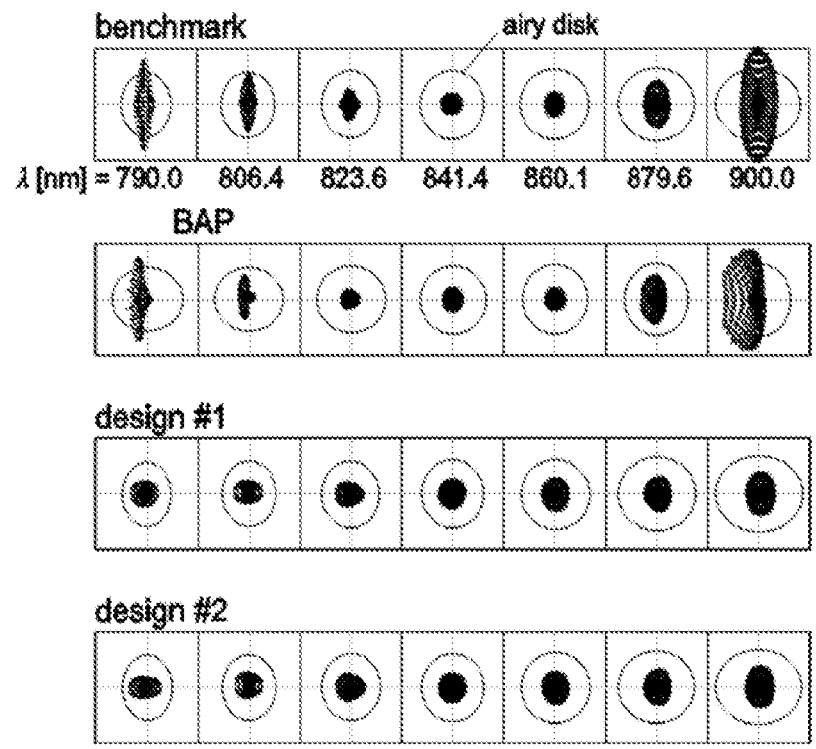
FIG. 4 depicts representative focal spots of the four spectrometers at different wavelengths throughout the range.

FIG. 4 shows the focal spots for each of the four spectrometers at different wavelengths throughout the spectrum. The focal spots of both the benchmark spectrometer 10 and the BAP spectrometer representing a quasi linear-in-k spectrometer tend to become more elliptical at the two ends of the spectrum. Although improving in wavenumber linearity, the addition of the Brewster-angled prism (BAP) 42 to replicate a quasi linear-in-k spectrometer introduces a field-dependent coma as seen in the spot diagram of the BAP spectrometer, which did not exist in the benchmark spectrometer 10. This field-dependent coma is the result of wavelength-dependent stop shift caused by the prism 42.

Figure 5:
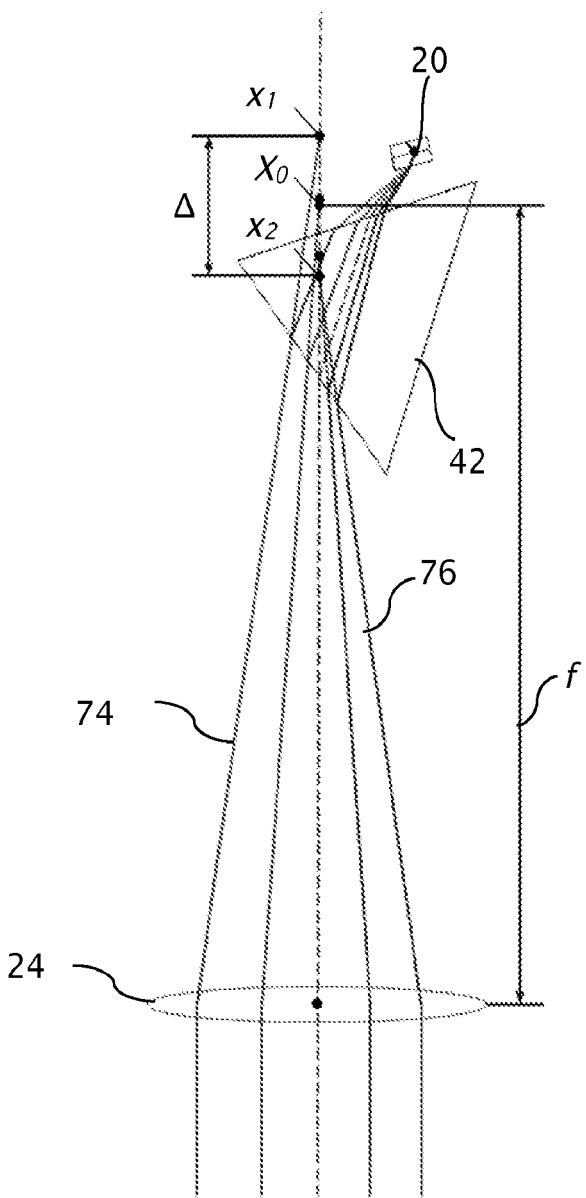
FIG. 5 is an optical diagram showing a wavelength dependent stop shift caused by a prism.

FIG. 5 illustrates chief rays traced in diagram from the diffractive optic 20 through the Brewster-angled prism (BAP) 42 to the focusing optic 24, which is more schematically depicted. The chief rays 74 and 76 of the maximum and minimum wavenumbers reaching the focusing lens 24 effectively depart from points $x_1$ and $x_2$ defining a spread of stop position, Δ, straddling focal point $x_0$ at the focal length f. The wavelength-dependent stop shifts caused by the prism 42 produce the field-dependent coma in the BAP spectrometer. As apparent from the spot diagrams of FIG. 4, the freeform surface 56 as defined for design #1 and design #2 of the absolute linear-in-k spectrometer 40 compensates for the field dependent aberrations introduced by the Brewster-angled prism (BAP) 42 so that the focal spots for the two spectrometers remain more consistently shaped over the spectrum.

Figure 6:
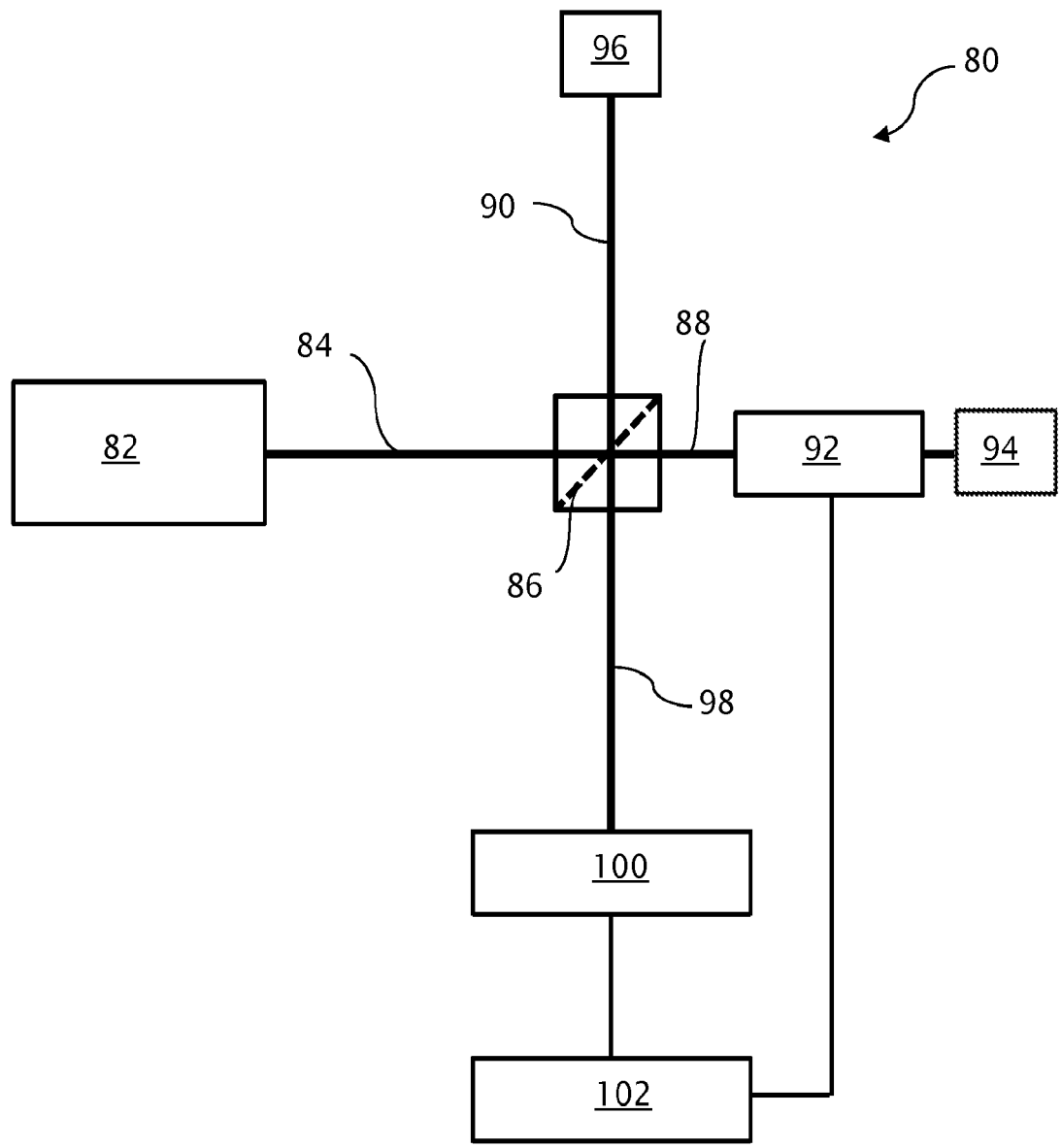
FIG. 6 is a diagram showing the overall layout of a representative spectral domain optical coherence tomography (SD-OCT) instrument.

A simplified layout of a spectral domain optical coherence tomography instrument 80 is shown in FIG. 6. A broadband light source 82 operating over a spectral range such as from 790 nm to 900 nm emits a source beam 84 that is divided by a beamsplitter 86 into an object beam 88 and a reference beam 90. The object beam 88 is directed through a scanner 92 to a test object 94, which reflects at least a portion of the object beam 88 back to the beamsplitter 86. Similarly, a reference object 96, such as a reference mirror, reflects the reference beam 90 back to the beamsplitter 86, where the returning object and reference beams 88 and 90 are recombined into a measurement beam 98 that is directed to a spectrometer 100, which can be similar to any one of the spectrometers previously discussed. Any optical path length differences between the object and reference beams 88 and 90 generate interference that produces intensity variations as a function of wavelength along the spectrometer's detector. A computer 102, which can also be used to control the scanner 92, includes a processor that receives intensity data from the respective pixels of the detector and transforms rates of variation in the intensity data into relative optical path length difference measurements between the object and reference beams 88 and 90 over a range of measurement related to a wavenumber spacing between the detector's pixels. For the quasi and absolute linear-in-k spectrometers, the transformation can take place directly through a fast Fourier transform of the intensity data without interpolating the data. Since the optical path length difference is generated under conditions of reflection, any variation in the distance to the test object 94 is equal to one half of the variation in the optical path length difference between the object and reference beams 88 and 90.

Measurement resolution is based on an axial point spread function (PSF) full width half maximum (FWHM) in the spectral domain optical coherence tomography (SD-OCT) instrument 80, which is theoretically determined by the central wavelength and the bandwidth of the light source 82. However, in practice, the accuracy of the spectrometer calibration in hardware and the dispersion mismatch between the reference and object beams can significantly affect the experimental axial point spread functions (PSFs). In experiment, it is extremely difficult to ensure that spectrometers are perfectly calibrated and that the interference signal entering the spectrometers has no dispersion mismatch. Therefore, as a baseline comparison, we adopt a simulation to evaluate the axial PSFs. According to the Wiener-Khinchin theorem, the coherence function, $\Gamma(\tau)$, is the inverse Fourier transform (FT) of the power spectrum of the source, $S(\nu)$. In spectral domain optical coherence tomography (SD-OCT), the spectral resolution reshapes the coherence function depending on the optical time delay, $\tau$, between the object and reference arms. This property implies a fall-off of the axial PSFs with measurement distance (i.e., image depth). The fall-off has been well understood with a Gaussian-shaped source and a uniform spectral resolution over wavenumber. Here, we develop a mathematical expression named the local coherence function to handle various source shapes and a non-uniform spectral resolution in wavenumber. The local power spectrum collected by the $i^{th}$ pixel is the convolution of an infinite number of k-dependent point spread functions (PSFs) with the $i^{th}$ pixel. The local spectrum $^iS(\nu)$ read by the $i^{th}$ pixel is approximated as the normalized Gaussian function of optical frequency, $\nu$, weighted by alpha $^i\alpha$ that reflects the source shape, assuming the total power is conserved as expressed in Eq. (4) below. For simplicity, we assume uniformity in diffraction efficiency over the wavelengths as well as no additional attenuation in the beam propagation by the prism and the lenses, such that the local spectrum $^iS(\nu)$ is given as:

$$^iS(\nu) = \frac{^i\alpha}{\sqrt{2\pi} \cdot ^i\delta_\nu} \exp\left[\frac{-(\nu - ^i\nu)^2}{2^i\delta_\nu^2}\right], \quad (3)$$

with $$\sum_{i=1}^{N} S(\nu) \cong S(\nu), \quad (4)$$

where $^i\nu$ is the mean frequency of the light focused on the $i^{th}$ pixel, $^i\delta_\nu$ is the standard deviation of the local spectrum $^iS(\nu)$, and N is the total number of pixels along the detector array. The standard deviation of the local spectrum is related to the FWHM spectral resolution, $SR_{FWHM}$, by a constant factor as:

$$SR_{FWHM} = 2\sqrt{2\ln 2} \cdot ^i\delta_\nu. \quad (5)$$

Taking the inverse Fourier transform (FT) of the local spectrum in Eq. (3), the local coherence function can be written as:

$$^i\Gamma(\tau) = ^i\alpha \cdot \exp\left[\frac{-\tau^2}{1/(2^i\delta_\nu^2\pi^2)}\right] \cdot \exp[-j2\pi^i\nu\tau]. \quad (6)$$

For a spectrometer in spectral domain optical coherence tomography (SD-OCT), the pixel i records the local intensity $^iI$, which is the autocorrelation of the incoming field $^iE_D$ averaged over a finite exposure time T as:

$$^iI = \frac{^i\rho}{2} \langle ^iE_D^*(t)^iE_D(t)\rangle_T, \quad (7)$$

$$^iE_D(t) = ^iK_R^iE_0(t) + \sum_n ^iK_n^iE_0(t+\tau_n), \quad (8)$$

where $^iE_0$ is the analytic representation of the source field arriving at the $i^{th}$ pixel, $^iK_R$ and $^iK_n$ are the reflection coefficients of the reference and $n^{th}$ sample, respectively, and $^i\rho$ is the quantum efficiency of the $i^{th}$ pixel. Eq. (8) is plugged into Eq. (7) to obtain the local intensity expressed using the local coherence function, $^i\Gamma(\tau)$, of Eq. (6) as:

$$^iI = \frac{^i\rho}{2}\left[\begin{array}{c}\left(|^iK_R|^2 + \sum_n |^iK_n|^2\right) \cdot ^i\Gamma(0) + \\ 2\text{Re}\left\{\sum_n ^iK_R^{*i}K_n^i\Gamma(\tau_n) + \sum_{l \neq m} ^iK_l^{*i}K_m^i\Gamma(\tau_l - \tau_m)\right\}\end{array}\right] \quad (9)$$

with:

$$^i\Gamma(\tau) = \langle ^iE_D^*(t)^iE_D(t+\tau)\rangle_T. \quad (10)$$

Figure 7A:
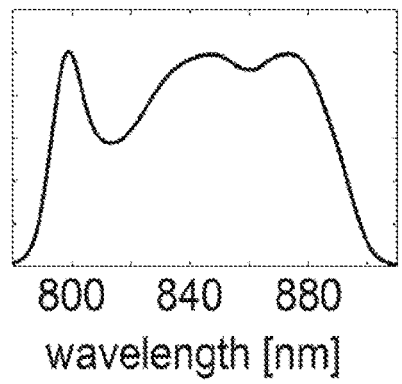
FIG. 7A depicts the spectral output of a light source.
Figure 7B:
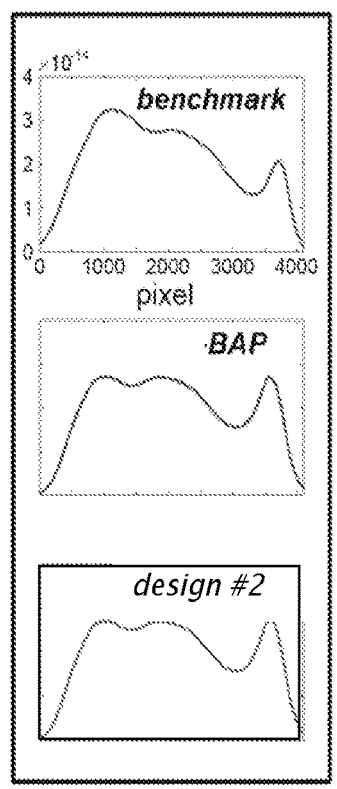
FIG. 7B shows the weighting of the local spectrum by each of three spectrometers.
Figure 7C:
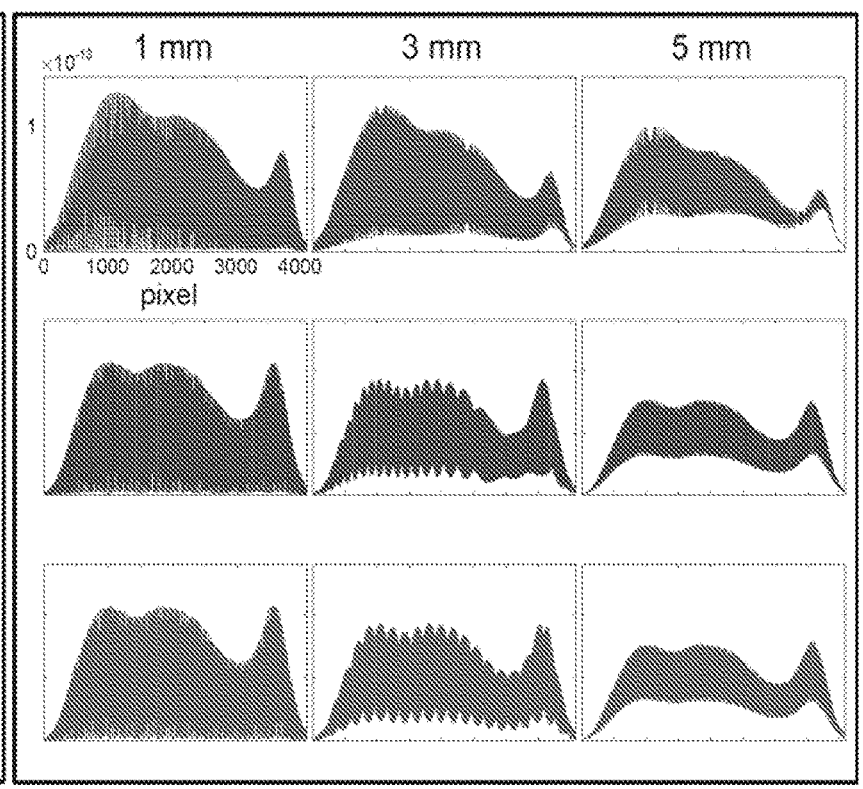
FIG. 7C shows spectral intensities of interference at three different measuring depths for each of the three interferometers.

Using Eq. (9), the raw data read by the benchmark, the BAP, and the two freeform spectrometers (designs #1 and #2) of N=4096 are created, respectively, with $^iK_R=1$ (a mirror) and $^iK_{n=1}=1$ (a mirror) for all i, assuming that the frequency dependence of the quantum efficiency is negligible. FIG. 7A illustrates the spectral intensity of from the source 82 (e.g., M-D-840-HP from Superlum Diodes Ltd., Carrigtwohill, Co. Cork, Ireland), the weight, $\alpha$, and the intensity, I, as a function of the pixel i. The weight, $\alpha$, shown in FIG. 7B for each of three spectrometers shows an inverse correlation with the FWHM spectral resolution in FIG. 3. This implies that the spectral resolution of the spectrometer does distort the envelop of the fringes in part during the measurement. As expected by Eq. (3), the local coherence function experiences an exponential decay proportional to $\tau^2$ with its wavenumber dependence in $^i\delta_\nu$, which results in the non-uniform loss of contrast in the fringes seen in FIG. 7C, which plots the spectral intensity of the interference with a path length difference of 1 mm, 3 mm, and 5 mm in air. The loss in fringe contrast appears across all three spectrometers as the number of pixels representing discrete phases within each cycle of constructive and destructive interference diminish with increases in the modulation frequency, which corresponds to the number of cycles of constructive and destructive interference that appear along the detector array. For example, individual cycles of constructive and destructive interference sampled by 2048 evenly spaced pixels at a modulation frequency of two are more likely to vary through pixel intensities corresponding to maximum constructive and destructive interference than individual cycles of constructive and destructive interference sampled by just two evenly spaced pixels at a modulation frequency of 2048. In addition, as modulation frequencies increase, each pixel averages the intensities of a greater range of phases associated with the individual cycles of constructive and destructive interference, which can further dampen contrast.

Figure 8A:
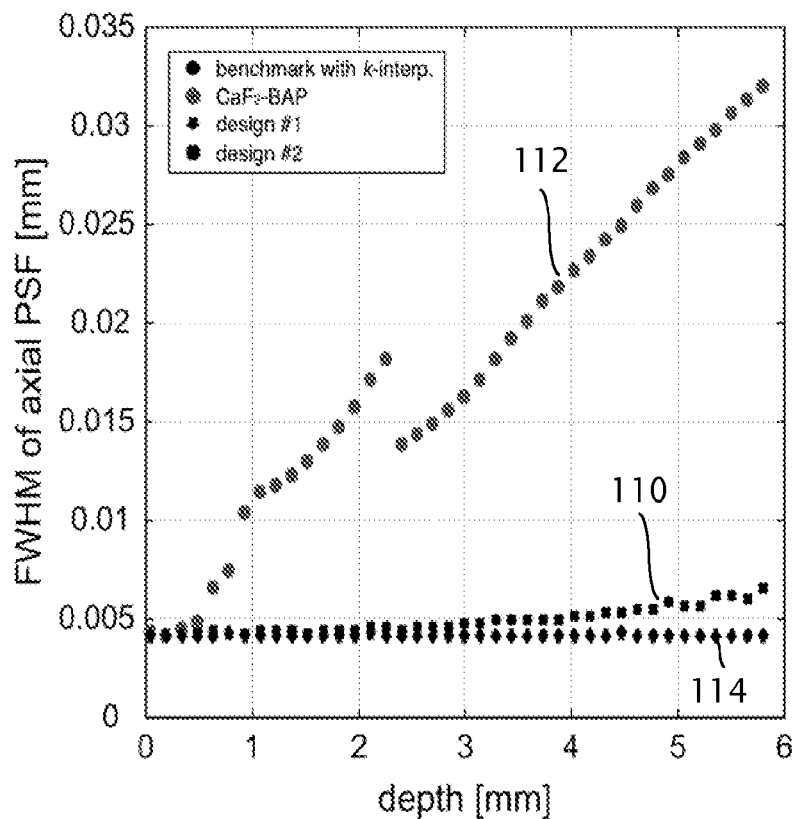
FIG. 8A is a graph of FWHM of an axial point spread function for each of the referenced spectrometers over a range of measurement in units of imaging depth.
Figure 8B:
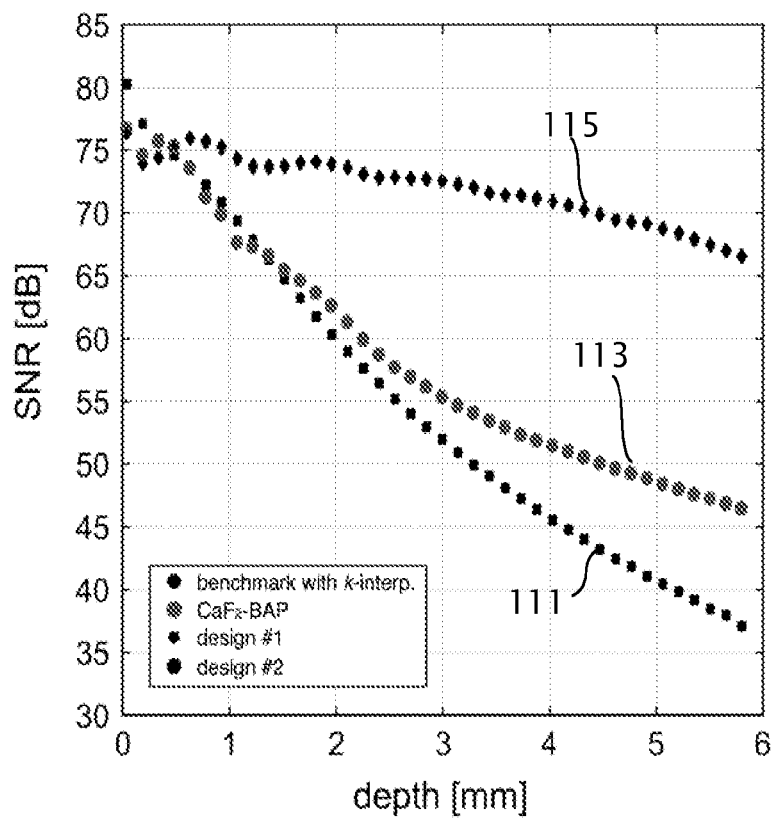
FIG. 8B is a graph of signal to noise ratio (SNR) for each of the referenced spectrometers over a range of measurement in units of imaging depth.

The performance of the four spectrometer designs are shown in the plots of FIGS. 8A and 8B in measures of the FWHM of the axial point spread function (PSF) and the signal to noise ratio (SNR) through the range of measurement (imaging depth). The axial PSFs by depth are directly obtained by taking the fast Fourier transform (FFT) of the simulated spectra for the BAP modified and the two absolute linear-in-k spectrometers 40 with no linearization in post processing. For the benchmark spectrometer 10, the raw spectra were interpolated along the linearly distributed k (i.e. linear k-interpolation) prior to the FFT. The axial resolution and the sensitivity were evaluated by the FWHM of the axial PSF and SNR (=20×$Log_{10}$[abs{FT}]), respectively. The benchmark spectrometer 10 with linear k-interpolation post processing showed a slowly varying FWHM of the axial PSF of 4.3 μm to 6.6 μm as shown by line 110 in FIG. 8A and a SNR drop of 43.2 dB along the imaging depth as shown by line 111 in FIG. 8B. In comparison for the BAP modified spectrometer, there is a small improvement in SNR of 9.3 dB at the maximum imaging depth as shown by line 113. However, the FWHM of the axial PSF for the BAP modified spectrometer broadened by depth to 32.0 μm as shown by line 112 in FIG. 8A. The absolute linear-in-k spectrometer designs #1 and #2 showed a quasi-constant FWHM axial PSF throughout of 4.2 μm to 4.3 μm as shown along line 114 and a significant 29.5 dB SNR gain at the maximum imaging depth compared to the benchmark spectrometer 10 as shown by line 115. For both absolute linear-in-k spectrometers, measurement resolution over the range of measurement varies by less than 5 percent. The same lines are referenced for both designs #1 and #2 because the generated data is indistinguishable between the designs at the scales plotted. These results are also summarized in Table 1.

TABLE 1

Summary of imaging performance

| Spectrometer | Residual nonlinearity [%] | SNR of the axial PSFs at 5.8 mm [dB] | FWHM of the axial PSFs [μm] |
|---|---|---|---|
| Benchmark | 2.47 | 37.1 | 4.26-6.57 |
| BAP | 0.05 | 46.4 | 4.15-32.0 |
| Design #1 | 2.79 × $10^{-5}$ | 66.6 | 4.16-4.33 |
| Design #2 | 3.36 × $10^{-9}$ | 66.6 | 4.16-4.33 |

While the components of an absolute linear-in-k spectrometer can be individually or sequentially optimized according to known practices for forming spectrometers and can be further optimized by the addition a freeform field lens for achieving extremely linear distributions of wavenumbers along a detector array, the optics of existing or otherwise conventionally designed benchmark spectrometers can also be used as starting points for the design of absolute linear-in-k spectrometers. For example, the benchmark spectrometer optics from the entrance aperture 12 through the focusing optic 24 can be reused. The modification of the field lens of the benchmark spectrometer can also be limited to changing just one surface. Added to the optics of the benchmark spectrometer, however, is a Brewster-angle prism, which can be accommodated by varying the orientation and spacing of the benchmark optics to make a substantial improvement in the linearity of wavenumbers along the detector array. Such linearity improvements are generally enough to obviate the need to interpolate the detector data before transforming the results into a frequency domain for optical coherence tomography use. For example, the residual nonlinearity of a benchmark spectrometer is expected to be at least one percent or within the range of one percent to four percent. The addition of the Brewster-angled prism, as described, is expected to reduce the residual nonlinearity similar to a quasi-linear-in-k spectrometer to within a range of $10^{-2}$ percent (0.01%) to one percent. The freeform surface of the field lens further reduces nonlinearity to less than $10^{-4}$ percent (0.0001%) or more preferably less than $10^{-5}$ percent (0.00001%), or where any further reduction in residual nonlinearity alone has no appreciable effect on improvements to both the signal to noise ratio (SNR) and the axial measurement resolution as an axial point spread function (PSF) FWHM.

As a test of how the nonlinearity can be affected by manufacturing tolerances, a Monte Carlo analysis can be performed, such as, for example, on design #2 of the absolute linear-in-k spectrometer. The tolerances can include ±3 fringes of lens radii error, 0.5 fringes of irregularity, 50 μm of lens thickness and air spaces error, 0.0005 refractive index error, 0.005 percent abbe-number error, 10 μm of lens wedge, 25 μm of lens decenter, 0.5 m rad of lens tilt, and 10 μm of doublet roll. The defocus (±40 μm) and tilt (±7 m rad) of the image plane and axial location of the fiber aperture (±250 μm) can be used to recover imaging performance. Decenter of the freeform field lens (±350 μm) can used as a compensator for the linearity.

For 10000 trials of a simulated fabrication of design #2, 95 percent of the outcomes maintain a nonlinearity of 6×$10^{-5}$ percent or lower. This value is similar to design #1's nonlinearity. Thus, a fabricated design #2 with the specified errors can be expected to behave similarly to the nominal design #1.

While described in more detail with respect to particular examples, those of skill in the art will appreciate that various modifications and substitutions can be made in keeping with the overall teaching of this disclosure. For example, while the detector is often flat and the measure of wavenumber linearity is considered along a straight line, the detector could also be curved matching a corresponding field curvature along which the wavenumbers are focused. The linearity in the wavenumber distribution can still be measured along a curved detector as a displacement of the considered chief rays from on-center pixel positions. Another example of such a modification includes the use of diffractive optics either in a transmissive mode as shown or in a reflective mode.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An absolute linear-in-K spectrometer comprising:
    a diffractive optic for diffracting collimated light from an entrance aperture into angularly dispersed wavenumbers;
    a prism for reducing a nonlinear angular dispersion among the wavenumbers;
    a focusing optic for converting the angularly dispersed wavenumbers from the prism into spatially distributed wavenumbers along a detector; and
    a field lens between the focusing optic and the detector having a freeform surface with a surface geometry that reduces field dependent aberrations introduced by the prism and more linearly distributes the wavenumbers along the detector;
    wherein a sag of the freeform surface is defined by a plurality of polynomial terms in which coefficients of the polynomial terms are constrained so that chief rays of evenly spaced wavenumbers are distributed along the detector in a form that is maximized toward an even spacing of the chief rays along the detector, such that a residual nonlinearity RN of the wavenumbers distributed along the detector is less than $10^{-4}$ percent, where the residual nonlinearity RN as a percent is determined in accordance with the following expression:

$$RN[\%] = \frac{\sqrt{\left(\int_{k_{min}}^{k_{max}} [f(k) - g(k)]^2 dk\right)/(k_{max} - k_{min})}}{f(k_{max}) - f(k_{min})} \times 100$$

where $k_{max}$ and $k_{min}$ are respective maximum and minimum wavenumbers distributed along the detector, f(k) is a function of calibration relating wavenumbers to pixels of the detector, and g(k) is the linear approximation of f(k) with the least root mean square error.

2. The spectrometer of claim 1 in which the freeform surface has a sag z defined in accordance with the following expression:

$$z = \frac{cr^2}{1 + \sqrt{1 - (1 + k_c)c^2 r^2}} + \sum_j C_j Z_j(\rho, \varphi),$$

where r is a radial coordinate of the surface, c is a curvature of a base sphere, $k_c$ is a conic constant, $\rho$ and $\varphi$ are normalized radial and azimuthal components in an aperture, and $C_j$ is a weight factor of a $j^{th}$ Zernike term, $Z_j$, where the weight factor $C_j$ is determined in a way that chief rays of evenly spaced wavenumbers are distributed along the detector in a form that is maximized toward an even spacing of the chief rays along the detector.

3. The spectrometer of claim 2 in which the expression for the sag z includes 16 Zernike terms Zj.

4. The spectrometer of claim 1 in which the prism is a Brewster-angled prism that is oriented and spaced between the diffractive optic and the focusing optic for reducing the nonlinear angular dispersion among the wavenumbers.

5. The spectrometer of claim 4 in which the field lens has front surface facing the focusing optic and a rear surface facing the detector, and the freeform surface is formed in either the rear or front surfaces of the field lens.

6. The spectrometer of claim 5 in which the focusing optic comprises a plurality of lenses each exhibiting rotational symmetry about a common optical axis.

7. A detector system for a spectral domain optical coherence tomography instrument comprising:
a diffractive optic for receiving light comprising a range of wavenumbers subject to interference phase variations as a function of optical path length differences between a test object and a reference and for diffracting the interfering light into angularly dispersed wavenumbers;
a prism for reducing a nonlinear angular dispersion among the wavenumbers;
a focusing optic for converting the angularly dispersed wavenumbers from the prism into spatially distributed wavenumbers along a detector having an array of pixels;
a field lens between the focusing optic and the detector, the field lens having a freeform surface for more evenly distributing the wavenumbers along the array of pixels;
a processor for receiving intensity data from the respective pixels and for transforming rates of variation in the intensity data into relative optical path length difference measurements between the test object and the reference over a range of measurement related to a wavenumber spacing between the pixels; and
the freeform surface having a surface geometry that reduces nonlinearity of the wavenumbers along the array of pixels such that measurement resolution over the range of measurement varies by less than 5 percent;
wherein a sag of the freeform surface is defined by a plurality of polynomial terms in which coefficients of the polynomial terms are constrained so that chief rays of evenly spaced wavenumbers are distributed along the detector in a form that is maximized toward an even spacing of the chief rays along the detector, such that a residual nonlinearity RN of the wavenumbers distributed along the detector is less than $10^{-4}$ percent, where the residual nonlinearity RN as a percent is determined in accordance with the following expression:

$$RN[\%] = \frac{\sqrt{\left(\int_{k_{min}}^{k_{max}} [f(k) - g(k)]^2 dk\right)/(k_{max} - k_{min})}}{f(k_{max}) - f(k_{min})} \times 100$$

where $k_{max}$ and $k_{min}$ are respective maximum and minimum wavenumbers distributed along the array of pixels, f(k) is a function of calibration relating wavenumbers to pixels of the detector, and g(k) is the linear approximation of f(k) with the least root mean square error.

8. The detector system of claim 7 in which the surface geometry of the freeform surface reduces nonlinearity of the wavenumbers along the array of pixels such that any further reduction in the nonlinearity alone does not further change the measurement resolution over the range of measurement.

9. The detector system of claim 7 in which the freeform surface has a sag z defined in accordance with the following expression:

$$z = \frac{cr^2}{1 + \sqrt{1 - (1 + k_c)c^2 r^2}} + \sum_j C_j Z_j(\rho, \varphi),$$

where r is a radial coordinate of the surface, c is a curvature of a base sphere, $k_c$ is a conic constant, $\rho$ and $\varphi$ are normalized radial and azimuthal components in an aperture, and $C_j$ is a weight factor of a $j^{th}$ Zernike term, $Z_j$, where the weight factor $C_j$ is determined in a way that chief rays of evenly spaced wavenumbers are distributed along the array of pixels in a form that is maximized toward an even spacing of the chief rays along the array of pixels.

10. The detector system of claim 7 in which the processor transforms the rates of variation in the intensity data into the relative optical path length difference measurements without requiring linear interpolations among the wavenumbers collected by the respective pixels.

11. The detector system of claim 10 in which the surface geometry of the freeform surface reduces field dependent aberrations introduced by the prism for focusing the spatially distributed wavenumbers along the array of pixels with more consistent spot sizes.

12. A method of making an absolute linear-in-k spectrometer comprising steps of:
- arranging a diffractive optic for receiving collimated light from an entrance aperture and for diffracting the light into angularly dispersed wavenumbers;
- arranging a focusing optic for focusing the angularly dispersed wavenumbers through a field lens into spatially distributed positions along a detector;
- interposing a Brewster-angled prism between the diffractive optic and the focusing optic;
- angularly orienting the diffractive optic and the prism and spacing the prism with respect to both the diffractive optic and the focusing optic for reducing a nonlinear distribution of the wavenumbers along the detector; and
- providing the field lens with a freeform surface having a surface geometry for reducing field dependent aberrations introduced by the Brewster-angled prism and for more evenly distributing the wavenumbers along the detector;
- further comprising defining a sag of the provided freeform surface by a plurality of polynomial terms in which coefficients of the polynomial terms are constrained so that chief rays of evenly spaced wavenumbers are distributed along the detector in a form that is maximized toward an even spacing of the chief rays along the detector, such that a residual nonlinearity RN of the wavenumbers distributed along the detector is less than $10^{-4}$ percent, where the residual nonlinearity RN as a percent is determined in accordance with the following expression:

$$RN[\%] = \frac{\sqrt{\left(\int_{k_{min}}^{k_{max}} [f(k) - g(k)]^2 dk\right)/(k_{max} - k_{min})}}{f(k_{max}) - f(k_{min})} \times 100$$

where $k_{max}$ and $k_{min}$ are respective maximum and minimum wavenumbers distributed along the array of pixels, f(k) is a function of calibration relating wavenumbers to pixels of the detector, and g(k) is the linear approximation of f(k) with the least root mean square error.

13. The method of claim 12 in which the step of arranging the focusing optic includes arranging the focusing optic as a plurality of lenses each exhibiting rotational symmetry about a common optical axis.

14. The method of claim 13 in which the steps of arranging the diffractive optic and arranging the focusing optic include designing the diffractive optic and the plurality of lenses according to a prescription for use in a benchmark spectrometer not employing the Brewster-angled prism or the field lens with a freeform surface, wherein residual nonlinearity of the wavenumbers along the detector in the benchmark spectrometer is greater than one percent.

15. The method of claim 14 in which the Brewster-angled prism is oriented and spaced between the diffractive optic and the focusing optic for reducing the residual nonlinearity of the wavenumbers along the detector from the residual nonlinearity of the benchmark spectrometer to less than one percent but greater than $10^{-2}$ percent in the absence of the field lens with a freeform surface.

* * * * *